(12) United States Patent
Sillard et al.

(10) Patent No.: US 6,856,725 B2
(45) Date of Patent: Feb. 15, 2005

(54) CHROMATIC DISPERSION COMPENSATION MODULE

(75) Inventors: Pierre Sillard, Le Chesnay (FR); Bruno Dany, Maisons-Laffitte (FR); Alain Bertaina, Paris (FR); Maxime Gorlier, Paris (FR)

(73) Assignee: Alcatel, Paris (FR)

( * ) Notice: Subject to any disclaimer, the term of this patent is extended or adjusted under 35 U.S.C. 154(b) by 13 days.

(21) Appl. No.: 10/665,012

(22) Filed: Sep. 22, 2003

(65) Prior Publication Data

US 2004/0218856 A1 Nov. 4, 2004

(30) Foreign Application Priority Data

Apr. 29, 2003 (FR) .............................. 03 05223

(51) Int. Cl.[7] .............................. G02B 6/26; G02B 6/00
(52) U.S. Cl. ........................................ 385/27; 385/147
(58) Field of Search .............................. 385/24, 31, 39, 385/41, 147, 27, 337.5

(56) References Cited

U.S. PATENT DOCUMENTS

| | | | |
|---|---|---|---|
| 5,261,016 A | | 11/1993 | Poole |
| 6,163,398 A | * | 12/2000 | Inagaki et al. ............ 359/337.5 |
| 6,504,973 B1 | * | 1/2003 | DiGovanni et al. ............ 385/27 |
| 2002/0048439 A1 | | 4/2002 | Tsukitani et al. |

FOREIGN PATENT DOCUMENTS

| | | |
|---|---|---|
| EP | 0 685 947 A1 | 12/1995 |
| EP | 1 030 472 A2 | 8/2000 |
| EP | 1 246 380 A2 | 10/2002 |
| WO | WO 97/45713 | 12/1997 |

OTHER PUBLICATIONS

Natalia M. Litchinitser et al, "Fiber Bragg Gratings for Dispersion Compensation in Transmission: Theoretical Model and Design Criteria for Nearly Ideal Pulse Recompression", Journal of Lightwave Technology, vol. 15, No. 8, Aug. 1997, pp. 1303–1313.

Y. Igarashi et al, "Performance of Dispersion Compensation for Ultrashort Light Pulse CDMA", IEEE Catalogue No. 01CH37239, IEEE Region 10 International Conference on Electrical and Electronic Technology, TENCON 2001, Singapore, Aug. 10–22, 2001, pp. 769–755, XP 10556349.

T. Kato et al, "Design Optimization of Dispersion Compensating Fiber for NZ–DSF Considering Nonlinearity and Packaging Performance", 2000 Optical Society of America, pp. TuS6–1–TuS6–3.

* cited by examiner

*Primary Examiner*—Akm Enayet Ullah
(74) *Attorney, Agent, or Firm*—Sughrue Mion, PLLC

(57) ABSTRACT

The field of the invention is that of chromatic dispersion compensation modules and of methods of designing chromatic dispersion compensation modules. The design method includes an optimization step consisting in reducing an original quality criterion at a chosen constant average figure of merit for the compensation optical fiber by increasing the attenuation of the compensation optical fiber. The compensation optical fiber of the module has chromatic dispersion more negative than a first threshold and, for a given figure of merit, attenuation that is sufficiently high for the quality criterion to be less than a second threshold and a quality-to-price ratio criterion to be less than a third threshold.

36 Claims, 8 Drawing Sheets

FIG. 3

| Modules | $D_{DCM}$ (ps/nm) | $D_{DCF}$ (ps/nm-km) | $S_{DCF}$ (ps/nm²-km) | $D_{DCF}/S_{DCF}$ (nm) | $\alpha_{DCF}$ (dB/km) | $FOM_{DCF}$ (ps/nm-dB) | $\Gamma$ (dB) | IL (dB) | $A_{eff}$ (μm²) | $n_2$ ($10^{-20}$ m²/W) | NLC ($10^{-6}$ km/W-dB) | CQ (dB) | CQ2 (dB) | COM ($10^{10}$ dB²-W/s) | CRP (%) |
|---|---|---|---|---|---|---|---|---|---|---|---|---|---|---|---|
| A1 | -1360 | -95 | -0.32 | 300 | 0.58 | 164 | 0.50 | 9.3 | 21 | 3 | 18.7 | 22.0 | 61.9 | 2.5 | 16 |
| A2 | -1360 | -95 | -0.32 | 300 | 0.47 | 202 | 0.50 | 7.7 | 21 | 3 | 21.3 | 21.0 | 62.5 | 1.6 | 26 |
| N1 | -1360 | -130 | -0.43 | 300 | 0.70 | 186 | 0.30 | 7.9 | 19 | 3 | 17.2 | 20.3 | 61.1 | 2.4 | 22 |
| N2 | -1360 | -200 | -0.67 | 300 | 0.95 | 211 | 0.30 | 7.1 | 18 | 3 | 12.7 | 18.1 | 59.9 | 2.7 | 22 |
| N3 | -1360 | -300 | -1.00 | 300 | 1.10 | 273 | 0.50 | 6.0 | 17 | 4 | 13.0 | 17.1 | 61.0 | 1.7 | 30 |
| N4 | -1360 | -300 | -1.00 | 300 | 1.40 | 214 | 0.50 | 7.3 | 17 | 4 | 11.5 | 18.0 | 59.9 | 2.8 | 18 |
| B1 | -1360 | -125 | -0.42 | 300 | 0.45 | 278 | 0.50 | 5.9 | 20 | 3 | 20.1 | 18.9 | 62.9 | 1.1 | 38 |
| B2 | -1360 | -250 | -0.83 | 300 | 0.75 | 333 | 0.25 | 4.6 | 18 | 3,8 | 16.2 | 16.7 | 62.1 | 1.1 | 45 |
| C1 | -1360 | -85 | -0.30 | 283 | 0.30 | 283 | 0.50 | 5.8 | 21 | 3,8 | 36.0 | 21.4 | 65.5 | 0.6 | 46 |
| C2 | -1360 | -150 | -0.60 | 250 | 0.45 | 333 | 0.50 | 5.1 | 19 | 4 | 25.4 | 19.1 | 64.5 | 0.6 | 47 |

FIG. 4

| Modules | $D_{DCM}$ (ps/nm) | $D_{DCF}$ (ps/nm-km) | $S_{DCF}$ (ps/nm²-km) | $D_{DCF}/S_{DCF}$ (nm) | $\alpha_{DCF}$ (dB/km) | $FOM_{DCF}$ (ps/nm-dB) | $\Gamma$ (dB) | IL (dB) | $A_{eff}$ (μm²) | $n_2$ (10⁻²⁰ m²/W) | NLC (10⁻⁶ km/W-dB) | CQ (dB) | CQ2 (dB) | COM (10¹⁰ dB²-W/s) | CRP (%) |
|---|---|---|---|---|---|---|---|---|---|---|---|---|---|---|---|
| N1 | -680 | -115 | -0.75 | 154 | 0.90 | 128 | 0.50 | 6.3 | 15 | 3 | 14.0 | 17.8 | 66.2 | 3.5 | 28.9 |
| N2 | -680 | -160 | -1.04 | 154 | 1.30 | 123 | 0.75 | 7.0 | 15 | 3 | 9.3 | 16.7 | 64.8 | 5.3 | 16.0 |
| N3 | -680 | -220 | -1.43 | 154 | 1.20 | 183 | 0.75 | 5.2 | 15 | 3 | 8.1 | 14.3 | 66.3 | 3.3 | 27.0 |
| N4 | -680 | -300 | -1.95 | 154 | 1.42 | 211 | 0.75 | 4.7 | 14 | 3 | 6.6 | 12.9 | 66.4 | 3.1 | 27.1 |
| N5 | -680 | -300 | -1.95 | 154 | 1.50 | 200 | 0.75 | 4.9 | 14 | 3 | 6.5 | 13.0 | 66.0 | 3.5 | 24.9 |
| B1 | -680 | -230 | -2.20 | 105 | 0.60 | 383 | 0.30 | 2.4 | 19 | 3 | 8.2 | 11.5 | 71.0 | 1.0 | 58.8 |
| B2 | -680 | -175 | -3.19 | 55 | 0.60 | 292 | 0.52 | 3.4 | 15 | 3 | 12.3 | 14.3 | 71.0 | 1.0 | 52.7 |
| B3 | -680 | -145 | -1.38 | 105 | 0.55 | 264 | 0.42 | 3.4 | 15 | 3 | 14.8 | 15.1 | 70.8 | 1.0 | 54.8 |
| B4 | -680 | -170 | -1.62 | 105 | 0.75 | 227 | 0.29 | 3.6 | 19 | 3 | 9.8 | 13.5 | 67.7 | 2.1 | 47.0 |
| C1 | -680 | -85 | -0.71 | 120 | 0.30 | 283 | 0.70 | 3.8 | 19 | 4 | 25.0 | 17.8 | 74.2 | 0.5 | 57.3 |
| C2 | -680 | -145 | -1.38 | 105 | 0.50 | 290 | 0.70 | 3.7 | 15 | 4 | 19.0 | 16.5 | 73.2 | 0.6 | 54.7 |
| C3 | -680 | -230 | -2.55 | 90 | 0.90 | 256 | 0.70 | 4.1 | 14 | 4 | 12.5 | 15.0 | 70.4 | 1.2 | 46.0 |
| C4 | -680 | -145 | -1.45 | 100 | 0.64 | 228 | 0.55 | 4.1 | 18 | 4 | 15.3 | 15.9 | 70.2 | 1.3 | 48.7 |
| C5 | -680 | -290 | -2.90 | 100 | 0.90 | 322 | 0.50 | 3.1 | 15.7 | 4 | 9.7 | 13.0 | 70.7 | 1.1 | 52.1 |
| C6 | -680 | -337 | -3.75 | 90 | 0.85 | 396 | 0.55 | 2.8 | 15 | 4 | 13.8 | 14.2 | 74.0 | 0.8 | 60.4 |
| C7 | -680 | -376 | -3.75 | 100 | 0.94 | 400 | 0.45 | 2.6 | 13.1 | 4 | 9.5 | 12.4 | 72.2 | 0.8 | 58.0 |

CHROMATIC DISPERSION COMPENSATION MODULE

The field of the invention is that of chromatic dispersion compensation modules. The terms "attenuation" and "attenuation coefficient" are used interchangeably with regard to optical fibers.

In some wavelength division multiplexing (WDM) optical fiber transmission networks including line optical fibers in which an optical signal propagates, there are no means of compensating the chromatic dispersion of the line optical fibers. When the bit rate is low, for example 2.5 gigabits per second (Gbit/s) per channel, it is not necessary to compensate the chromatic dispersion of the line optical fibers. However, as the bit rate increases to high values, for example 10 Gbit/s per channel, it becomes necessary to compensate the chromatic dispersion and the dispersion slope of the line optical fibers. A line optical fiber generally has positive chromatic dispersion and positive dispersion slope. Consequently, the optical fiber for compensating chromatic dispersion will generally have negative chromatic dispersion and negative dispersion slope. The chromatic dispersion compensation optical fiber can be integrated into a chromatic dispersion compensation module. The spectral range within which chromatic dispersion is to be compensated can include one or more of bands C, L and S.

The optical signal propagates in the chromatic dispersion compensation optical fiber. As it propagates in the chromatic dispersion compensation optical fiber, the optical signal is liable to deteriorate, for example to suffer a decrease in the signal-to-noise ratio or an increase in non-linear effects. A chromatic dispersion compensation module for compensating the chromatic dispersion of a segment of line optical fiber, which is usually several tens of kilometers (km) long, generally has insertion losses that are relatively high, of the order of several decibels (dB). Because of the magnitude of its insertion losses, the chromatic dispersion compensation module is generally placed at the center of a two-stage amplifier system, i.e. between two amplifiers.

For the two-stage amplifier system to have a good optical signal-to-noise ratio and gain that is flat across the spectrum, the two-stage amplifier system presents a first amplifier with high gain, which yields high optical power at the output of the first amplifier, and presents losses between the two amplifiers at a level that is fixed.

The chromatic dispersion compensation optical fiber integrated into the chromatic dispersion compensation module is a single-mode optical fiber which has a small effective area, in the range 10 square micrometers ($\mu m^2$) to 35 $\mu m^2$, which makes it very sensitive to non-linear effects. To preserve good optical signal transmission quality it is beneficial to limit the optical power input into the chromatic dispersion compensation single-mode optical fiber. To achieve this, an attenuator is placed between the first amplifier and the chromatic dispersion compensation module. The attenuator also controls the flatness of the gain across the spectrum. The attenuator can be replaced by a wavelength routing component or by any other optical component that has losses and can therefore, like the attenuator, limit the optical power input into the chromatic dispersion compensation module.

The problem is to produce a chromatic dispersion compensation module offering the best possible quality whilst limiting its cost, i.e. achieving the best possible quality-to-price ratio for the chromatic dispersion compensation module. The question arises: how are the quality, the cost, and the quality-to-price ratio of a chromatic dispersion compensation module to be evaluated?

It is known in the art to attempt to minimize the insertion losses of the compensation module, and to this end to increase as much a possible the figure of merit of the compensation optical fiber, which unfortunately greatly increases the cost of producing the compensation optical fiber and consequently the compensation module. As the quality of the compensation module increases, the price increases at a faster rate, and the quality-to-price ratio is therefore degraded. The paper "Design optimization of dispersion compensating fiber for NZ-DSF considering non-linearity and packaging performance" by T. Kato, M. Hirano, K. Fukuda, A. Tada, M. Onishi and M. Nishimura presented at the OFC 2001 conference, teaches attempting to minimize the non-linear phase of the compensation module, and to this end increasing as much as possible the figure of merit of the compensation optical fiber, which unfortunately greatly increases the cost of producing the compensation optical fiber and consequently the cost of the compensation module. As the quality of the compensation module increases, the price increases at a faster rate, and consequently the quality-to-price ratio is degraded.

Mediocre prior art compensation modules are available at reasonable cost and good prior art compensation modules are available at exorbitant cost. The object of the invention is to improve the quality-to-price ratio of a compensation module, and in particular to provide good modules at reasonable cost.

Prior art methods of improving the quality of a compensation module are based on unilaterally improving a parameter that is partially representative of the quality of the compensation module. Unilaterally improving only one parameter that is partially representative of the quality of the compensation module, whether that parameter be insertion losses or non-linear phase, has two consequences. Firstly, it increases the cost of the compensation module. Secondly, it tends to degrade the other parameter that is partially representative of the quality of the compensation module, which fails to improve the quality of the compensation module, or improves it only slightly, or improves it insufficiently. Naturally, a very great increase in the figure of merit of the compensation optical fiber would always be reflected in a greater or lesser improvement in the quality of the compensation module, but also in a very high increase in the cost of the compensation module, which is why the quality-to-price ratio of the compensation module is degraded.

The method of the invention of improving the quality of a compensation module is completely different. Firstly, it creates a quality criterion that is globally representative of the quality of a compensation module which integrates, with appropriate weighting, the contribution of insertion losses and the contribution of non-linear effects. The contribution of insertion losses corresponds to the conventional insertion losses except that they are related to compensation over the entire line optical fiber, while the contribution of non-linear effects is introduced by means of a non-linearity criterion that is related to the non-linear phase but is not the same as the non-linear phase. This non-linearity criterion is obtained by a clever simplification of the non-linear phase that takes account of the constant level of losses between the two amplifiers of the two-stage amplifier system. This original quality criterion can be optimized with a chosen constant figure of merit of the compensation optical fiber, thereby improving the quality of the compensation module at constant cost, and thus improving the quality-to-price ratio of the compensation module. To this end, in a manner that is entirely original and somewhat paradoxical, the invention is based on the observation that it is advantageous to increase the attenuation of the compensation optical fiber at a constant figure of merit of the compensation optical fiber. With a constant figure of merit, the insertion losses remain exactly the same, while increasing attenuation greatly improves the non-linearity criterion. The quality criterion suggests, even more paradoxically, that it can be beneficial to degrade slightly the figure of merit of the optical fiber, and consequently the insertion losses, provided that the negative chromatic dispersion is made more negative and the figure of merit of the compensation optical fiber is reduced, which amounts to increasing the attenuation of the compensation optical fiber greatly, since this greatly improves the non-linearity criterion, and thus more than adequately compensates for the degraded insertion losses. This is always advantageous, but especially so in the case of a two-stage amplifier system as referred to above, since in this case the slightly degraded insertion losses are not reflected in any degradation of the optical signal, but only in reduced attenuation of the attenuator, and thus in a higher amplitude of the signal input into the compensation optical fiber, which the compensation optical fiber is well able to accept because its ability to withstand non-linear effects has been significantly improved. The invention also creates a quality-to-price ratio criterion that integrates the extracost caused by improving the figure of merit of the compensation optical fiber, which makes it possible to verify that any improvement in the figure of merit of the compensation optical fiber is reflected in a comparable improvement in the quality of the compensation module. To this end, provided that the improvement in the figure of merit is obtained much more by making the negative chromatic dispersion of the compensation optical fiber more negative than it is by reducing the attenuation of the compensation optical fiber, and preferably when the improvement in the figure of merit is obtained by making the chromatic dispersion of the compensation optical fiber more negative while simultaneously greatly increasing the attenuation of the compensation optical fiber, then this improvement in the figure of merit not only improves quality, as expected, but also improves the quality-to-price ratio; in other words, it improves quality much more than it increases price.

Thus the invention proposes a compensation module design method and two compensation modules, one for compensating a standard single-mode line optical fiber (SMF) and the other for compensating a non-zero dispersion-shifted line optical fiber (NZ-DSF), i.e. a fiber in which the dispersion is shifted relative to the standard single-mode optical fiber and which has non-zero dispersion at the wavelength of 1550 nanometers (nm).

The invention provides a method of designing a chromatic dispersion compensation module, said module being adapted to comprise, an enclosure including an input terminal and an output terminal, a chromatic dispersion compensation optical line situated inside the enclosure and connecting the input terminal to the output terminal, the line comprising one or more chromatic dispersion compensation single-mode optical fibers in series and not comprising any HOM multimode optical fiber, said module being adapted to be inserted by means of the input and output terminals into a transmission line comprising a single-mode line optical fiber adapted to transmit information in a spectral domain of use, the input terminal introducing into the transmission line an input loss $\Gamma_{in}$ expressed in dB, the output terminal introducing into the transmission line an output loss $\Gamma_{out}$ expressed in dB, additional connections, if any, between compensation optical fibers together introducing into the transmission line a connection loss linter expressed in dB, the compensation optical fiber or the set of compensation optical fibers in series having, at a wavelength of 1550 nm, a plurality of average parameters including an average coefficient of attenuation $\alpha_{DCF}$ expressed in decibels per kilometer (dB/km), a negative average chromatic dispersion $D_{DCF}$ expressed in picoseconds per nanometer-kilometer (ps/nm-km), a negative average dispersion slope $S_{DCF}$ expressed in picoseconds per nanometersquared-kilometer (ps/nm$^2$-km), an average chromatic dispersion to dispersion slope ratio $D_{DCF}/S_{DCF}$ expressed in nm, an average figure of merit $FOM_{DCF}$ defined as $-D_{DCF}/\alpha_{DCF}$ expressed in picoseconds per nanometer decibel (ps/nm-dB), an average effective area $A_{eff}$ expressed in $\mu m^2$, and an average second order coefficient $n_2$ of the refractive index as a function of the intensity expressed in $10^{-20}$ square meters per watt (m$^2$/W), the average chromatic dispersion to dispersion slope ratio being the ratio between the average chromatic dispersion and the average dispersion slope, the average figure of merit being the negative of the ratio between the average chromatic dispersion and the average coefficient of attenuation, the average coefficient of attenuation in the case of a single compensation optical fiber being lumped with the corresponding coefficient of attenuation of said single compensation optical fiber and in the case of a set of compensation optical fibers in series, the average coefficient of attenuation is equal to the sum of the corresponding attenuation coefficients of the various compensation optical fibers weighted by their respective contributions to the total series length of the compensation optical fibers plus the ratio of the connection loss divided by said total length, each of said other average parameters in the case of a single compensation optical fiber being lumped with the corresponding parameter of said single compensation optical fiber and each of said other average parameters in the case of a set of compensation optical fibers in series being the arithmetic mean of the corresponding parameters of the various compensation optical fibers when weighted by the respective lengths of said various compensation optical fibers, said module being adapted to have insertion losses IL expresses in dB, where $$IL = \frac{D_{DCM}}{D_{DCF}} \cdot \alpha_{DCF} + \Gamma_{in} + \Gamma_{out}$$

and where $D_{DCM}$ represents the negative of the cumulative dispersion of the line optical fiber, said module being adapted to have a non-linearity criterion NLC representing the effects of the non-linear phase and expressed in $10^{-6}$km/W-dB, where $$NLC = \frac{100 \cdot n_2 \cdot \left(1 - 10^{\frac{D_{DCM}}{10 \cdot FOM_{DCF}}}\right)}{A_{eff} \cdot \alpha_{DCF} \cdot 10^{\frac{\Gamma_{in}}{10}}},$$

said module being adapted to have a quality criterion CQ expressed in dB, where CQ=IL+10logNLC, said design method including an optimization step for optimizing said module, said optimization step consisting in reducing the quality criterion at a chosen constant average figure of merit by increasing the average attenuation.

To compensate a standard single-mode line optical fiber, the invention also provides a chromatic dispersion compensation module comprising, an enclosure including an input terminal and an output terminal, a chromatic dispersion compensation optical line situated inside the enclosure and connecting the input terminal to the output terminal, the line comprising one or more chromatic dispersion compensation single-mode optical fibers in series and not comprising any HOM multimode optical fiber, the module being adapted to be inserted by means of the input and output terminals into a transmission line comprising a standard single-mode line optical fiber adapted to transmit information in a spectral domain of use, the input terminal introducing into the transmission line an input loss $\Gamma_{in}$ expressed in dB, the output terminal introducing into the transmission line an output loss $\Gamma_{out}$ expressed in dB, additional connections, if any, between compensation optical fibers together introducing into the transmission line a connection loss $\Gamma_{inter}$ expressed in dB, the compensation optical fiber or the set of compensation optical fibers in series having, at a wavelength of 1550 nm, a plurality of average parameters including an average coefficient of attenuation $\alpha_{DCF}$ expressed in dB/km, a negative average chromatic dispersion $D_{DCF}$ expressed in ps/nm-km, a negative average dispersion slope $S_{DCF}$ expressed in ps/nm²-km, an average chromatic dispersion to dispersion slope ratio $D_{DCF}/S_{DCF}$ expressed in nm, an average figure of merit $FOM_{DCF}$ defined as $-D_{DCF}/\alpha_{DCF}$ expressed in ps/nm-dB, an average effective area $A_{eff}$ expressed in $\mu m^2$, and an average second order coefficient $n_2$ of the refractive index as a function of the intensity expressed in $10^{-20} m^2/W$, the average chromatic dispersion to dispersion slope ratio being the ratio between the average chromatic dispersion and the average dispersion slope, the average figure of merit being the negative of the ratio between the average chromatic dispersion and the average coefficient of attenuation, the average coefficient of attenuation in the case of a single compensation optical fiber being lumped with the corresponding coefficient of attenuation of said single compensation optical fiber and in the case of a set of compensation optical fibers in series, the average coefficient of attenuation is equal to the sum of the corresponding attenuation coefficients of the various compensation optical fibers weighted by their respective contributions to the total series length of the compensation optical fibers plus the ratio of the connection loss divided by said total length, each of said other average parameters in the case of a single compensation optical fiber being lumped with the corresponding parameter of said single compensation optical fiber and each of said other average parameters in the case of a set of compensation optical fibers in series being the arithmetic mean of the corresponding parameters of the various compensation optical fibers when weighted by the respective lengths of said various compensation optical fibers, the module having insertion losses IL expressed in dB, where $$IL = \frac{D_{DCM}}{D_{DCF}} \cdot \alpha_{DCF} + \Gamma_{in} + \Gamma_{out}$$

and where $D_{DCM} = -1360$ ps/nm, the module having a non-linearity criterion NLC representing the effects of the non-linear phase and expressed in $10^{-6}$ km/W-dB, where $$NLC = \frac{100 \cdot n_2 \cdot \left(1 - 10^{\frac{D_{DCM}}{10 \cdot FOM_{DCF}}}\right)}{A_{eff} \cdot \alpha_{DCF} \cdot 10^{\frac{\Gamma_{in}}{10}}},$$

the module having a quality criterion CQ expressed in dB, where CQ=IL+10logNLC, the module having a quality-to-price ratio criterion CQ2 expressed in dB, where CQ2=CQ+Blog($FOM_{DCF}$)

and where B=18, and the compensation optical fiber or the set of compensation optical fibers in series having, firstly, average chromatic dispersion more negative than −130 ps/nm-km, secondly, average chromatic dispersion to dispersion slope ratio in the range 240 nm to 400 nm, and thirdly, for a given average figure of merit, average attenuation sufficiently high for the quality criterion to be less than 20.5 dB and the quality-to-price ratio criterion to be less than 61.3 dB.

To compensate a non-zero dispersion shifted single-mode line optical fiber, the invention further provides a chromatic dispersion compensation module comprising an enclosure including an input terminal and an output terminal, a chromatic dispersion compensation optical line situated inside the enclosure and connecting the input terminal to the output terminal, the line comprising one or more chromatic dispersion compensation single-mode optical fibers in series and not comprising any HOM multimode optical fiber, the module being adapted to be inserted by means of the input and output terminals into a transmission line comprising a non-zero dispersion at 1550 nm single-mode dispersion shifted line optical fiber adapted to transmit information in a spectral domain of use, the input terminal introducing into the transmission line an input loss $\Gamma_{in}$ expressed in dB, the output terminal introducing into the transmission line an output loss $\Gamma_{out}$ expressed in dB, additional connections, if any, between compensation optical fibers together introducing into the transmission line a connection loss $\Gamma_{inter}$ expressed in dB, the compensation optical fiber or the set of compensation optical fibers in series having, at a wavelength of 1550 nm, a plurality of average parameters including an average coefficient of attenuation $\alpha_{DCF}$ expressed in dB/km, a negative average chromatic dispersion $D_{DCF}$ expressed in ps/nm-km, a negative average dispersion slope $S_{DCF}$ expressed in ps/nm²-km, an average chromatic dispersion to dispersion slope ratio $D_{DCF}/S_{DCF}$ expressed in nm, an average figure of merit $FOM_{DCF}$ defined as $-D_{DCF}/\alpha_{DCF}$ expressed in ps/nm-dB, an average effective area $A_{eff}$ expressed in $\mu m^2$, and an average second order coefficient $n_2$ of the refractive index as a function of the intensity expressed in $10^{-20} m^2/W$, the average chromatic dispersion to dispersion slope ratio being the ratio between the average chromatic dispersion and the average dispersion slope, the average figure of merit being the negative of the ratio between the average chromatic dispersion and the average coefficient of attenuation, the average coefficient of attenuation in the case of a single compensation optical fiber being lumped with the corresponding coefficient of attenuation of said single compensation optical fiber and in the case of a set of compensation optical fibers in series, the average coefficient of attenuation is equal to the sum of the corresponding attenuation coefficients of the various compensation optical fibers weighted by their respective contributions to the total series length of the compensation optical fibers plus the ratio of the connection loss divided by said total length, each of said other average parameters in the case of a single compensation optical fiber being lumped with the corresponding parameter of said single compensation optical fiber and each of said other average parameters in the case of a set of compensation optical fibers in series being the arithmetic mean of the corresponding parameters of the various compensation optical fibers when weighted by the respective lengths of said various compensation optical fibers, the module having insertion losses IL expressed in dB, where $$IL = \frac{D_{DCM}}{D_{DCF}} \cdot \alpha_{DCF} + \Gamma_{in} + \Gamma_{out}$$

and where $D_{DCF}=-680$ ps/nm, the module having a non-linearity criterion NLC representing the effects of the non-linear phase and expressed in $10^{-6}$ kilometers per watt-decibel (km/W-dB), where $$NLC = \frac{100 \cdot n_2 \cdot \left(1 - 10^{\frac{D_{DCM}}{10 \cdot FOM_{DCF}}}\right)}{A_{eff} \cdot \alpha_{DCF} \cdot 10^{\frac{\Gamma_{in}}{10}}},$$

the module having a quality criterion CQ expressed in dB, where CQ=IL+10logNLC, the module having a quality-to-price ratio criterion CQ2 expressed in dB, where CQ2=CQ+Blog(FOM$_{DCF}$)

and where B=23, and the compensation optical fiber or the set of compensation optical fibers in series having, firstly, an average chromatic dispersion more negative than −115 ps/nm-km, and secondly, for a given average figure of merit, average attenuation sufficiently high for the quality criterion to be less than 18 dB and the quality-to-price ratio criterion to be less than 66.6 dB.

Although less pertinent in the context of use with an amplification and compensation system other than the two-stage amplification and compensation system referred to above, the quality and quality-to-price ratio criteria remain valid and beneficial. The invention is not limited to use in the context of a two-stage amplification and compensation system of the type described hereinabove.

The invention will be more clearly understood and other features and advantages will become apparent in the light of the following description and the accompanying drawings, which are provided by way of example, and in which:

FIG. 3 is a table comparing the relative performance of prior art compensation modules and examples of compensation modules of the invention in the case of compensating a standard single-mode line optical fiber;

FIG. 4 is a table comparing the relative performance of prior art compensation modules and examples of compensation modules of the invention in the case of compensating a non-zero dispersion shifted single-mode line optical fiber;

Figure 9:
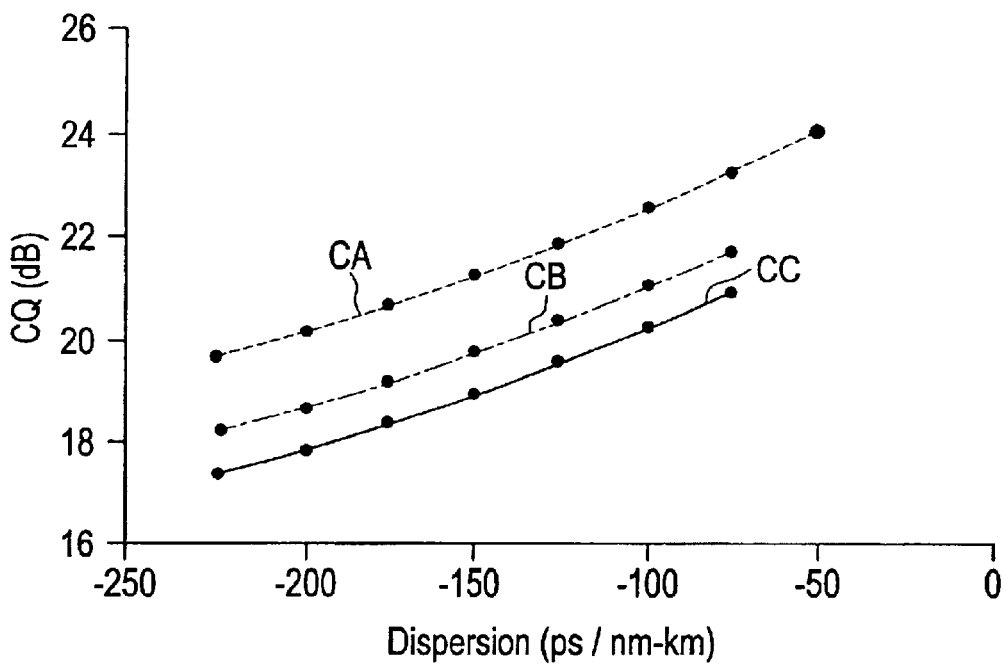
Figure 10:
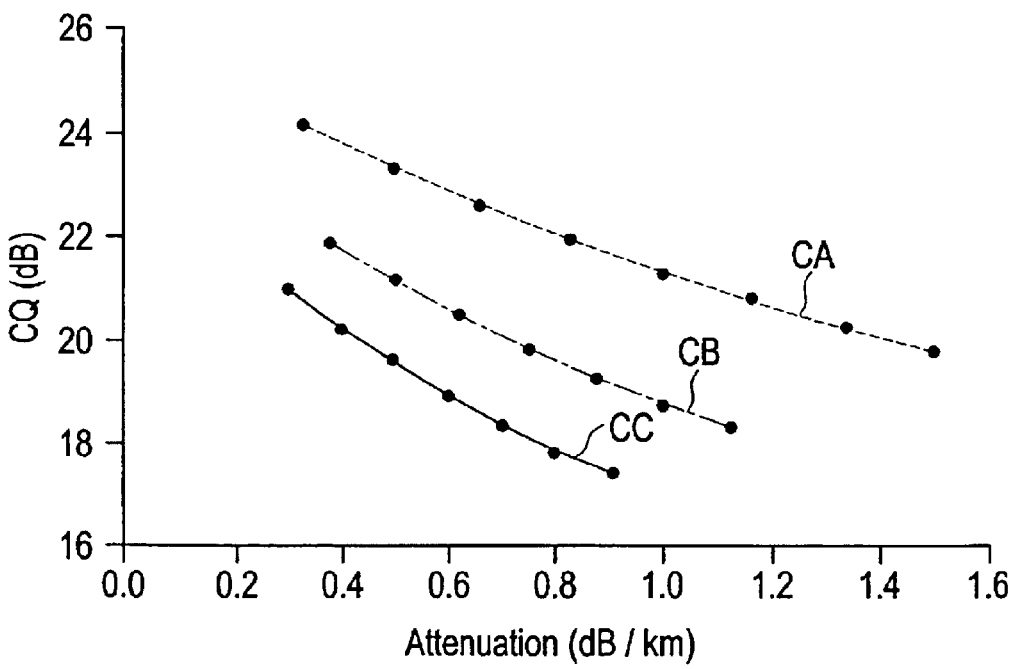

FIG. 9 is a diagram showing a family of curves plotting the variation in the quality criterion as a function of the chromatic dispersion of the compensation optical fiber at a chosen constant figure of merit for the compensation optical fiber in the case of compensating a standard single-mode line optical fiber; and FIG. 10 is a diagram showing a family of curves plotting the variation in the quality criterion as a function of the attenuation of the compensation optical fiber at a chosen constant figure of merit for the compensation optical fiber in the case of compensating a standard single-mode line optical fiber.

All of FIGS. 5 to 10 relate to compensating a standard single-mode line optical fiber, but the trends of the curves are the same when compensating a non-zero is dispersion shifted single-mode line optical fiber. Parameters and criteria that are used throughout the remainder of the text are defined next. There are two situations to consider: either the module comprises a single compensation optical fiber, which fiber has parameters, or the module comprises a plurality of compensation optical fibers in series, constituting a set of fibers which has average parameters. For simplicity, in all of FIGS. 1 to 10 the compensation module is considered as comprising only one compensation optical fiber and the qualifier "average" in the definition of the parameters may be disregarded.

When the compensation module comprises only one compensation optical fiber, the module has the great advantage that its design and fabrication are simplified.

When the compensation module comprises a plurality of compensation optical fibers from the same family, i.e. either a plurality of segments taken from one and the same compensation optical fiber or from different production runs of the same compensation optical fiber, and therefore subject to slight differences caused by fabrication tolerances, and the optical fibers are matched and assembled together, the fibers provide some properties that are defined with great accuracy, despite wider fabrication tolerances, for example more accurate compensation of the dispersion slope or the chromatic dispersion to dispersion slope ratio of the line optical fiber. The compensation optical fibers of the same family are preferably connected together directly, but could be connected together by means of a connector. The compensation module has the advantages of simplicity of design and of improvement of some of its properties.

When the compensation module comprises a plurality of separate compensation optical fibers that are matched and assembled together, they provide compensation over a very wide spectral band, i.e. over at least two of the spectral bands S, C and L. The S, C and L spectral bands respectively range from approximately 1460 nanometers (nm) to approximately 1530 nm, from approximately 1530 nm to approximately 1565 nm, and from approximately 1565 nm to approximately 1615 nm. However, the compensation module then has the drawback that its design and production are difficult.

Consider two fibers having respective lengths l1 and l2, respective coefficients of attenuation per unit length a1 and a2, and a connection loss pc between the two fibers. The average coefficient of attenuation per unit length am of all of the compensation optical fibers in series has the value am=(a1.l1+a2.l2+pc)/(l1+l2). This type of calculation of the average attenuation coefficient can be generalized to more than two compensation optical fibers in series. Only the average coefficient of attenuation, which is a special case of the optical fiber parameters, is calculated in this manner, and all the other average parameters are calculated in other ways.

Consider two optical fibers with respective lengths l1 and l2 and respective chromatic dispersions per unit length c1 and c2. The average chromatic dispersion per unit length cm of all of the compensation optical fibers in series has the value cm=(c1.l1+c2.l2)/(l1+l2). This type of average chromatic dispersion calculation can be generalized to more than two compensation optical fibers in series. All the other average parameters, with the exception of the average coefficient of attenuation, the average chromatic dispersion to dispersion slope ratio, and the average figure of merit, are calculated in this manner, namely, the average dispersion slope, the average effective area, and the average second order coefficient, conventionally designated $n_2$, of the refractive index of the optical fiber as a function of the intensity of the optical signal propagating in the optical fiber. The average chromatic dispersion to dispersion slope ratio is the ratio between the average chromatic dispersion and the average dispersion slope. The average figure of merit is the negative of the ratio between the average chromatic dispersion and the average coefficient of attenuation.

There is an exact non-linearity criterion formula in the case of two compensation optical fibers in series, referred to as optical fiber a and optical fiber b, for example. The exponents a and b of the various parameters represent those parameters for the optical fibers a and b, respectively.

The exact formula, in which $\Gamma_{in}^b = \Gamma_{inter}$ in the case of two compensation optical fibers in series, is as follows $$NLC = 100 \cdot \left( \frac{n_2^a}{A_{eff}^a \cdot \alpha_{DCF}^a \cdot 10^{\left(\frac{\Gamma_{in}^a}{10}\right)}} \left[1 - 10^{\left(\frac{D_{DCM}^a}{10 \cdot FOM_{DCF}^a}\right)}\right] + \right.$$

-continued $$\left. \frac{10^{\left(\frac{D_{DCM}^a \cdot \alpha_{DCF}^b}{10 \cdot FOM_{DCF}^a \cdot \alpha_{DCF}^a}\right)} \cdot n_2^b}{A_{eff}^b \cdot \alpha_{DCF}^b \cdot 10^{\left(\frac{\Gamma_{in}^a + \Gamma_{in}^b}{10}\right)}} \left[1 - 10^{\left(\frac{D_{DCM}^b}{10 \cdot FOM_{DCF}^b}\right)}\right] \right)$$

However, approximate formulas obtained from the average parameters of the compensation optical line yield excellent results that are very similar to those obtained using the exact formula. This is why the approximate formula is used.

The chromatic dispersion compensation module comprises a chromatic dispersion compensation optical line and an enclosure having an input terminal and an output terminal. The chromatic dispersion compensation line comprises one chromatic dispersion compensation single-mode optical fiber or two chromatic dispersion compensation single-mode optical fibers in series, does not comprise any HOM multi-mode optical fiber, is situated in the enclosure, and connects the input terminal to the output terminal. The module is intended to be connected, by means of the input and output terminals, into a transmission line comprising a single-mode line optical fiber adapted to transmit information in a spectral domain of use. The input terminal introduces into the transmission line an input loss $\Gamma_{in}$ expressed in dB. The output terminal introduces into the transmission line an output loss $\Gamma_{out}$ expressed in dB. If the compensation line comprises a plurality of compensation optical fibers in series, additional connections between compensation optical fibers together introduce into the transmission line a connection loss $\Gamma_{inter}$ expressed in dB.

The compensation optical fiber, or the set of compensation optical fibers in series, has average parameters at a wavelength of 1550 nm including an average coefficient of attenuation $\alpha_{DCF}$ expressed in dB/km, an average chromatic dispersion $D_{DCF}$ expressed in ps/nm-km and that is negative, an average dispersion slope $S_{DCF}$ expressed in ps/nm$^2$-km and that is negative, an average chromatic dispersion to dispersion slope ratio $D_{DCF}/S_{DCF}$ expressed in nm, an average figure of merit $FOM_{DCF}$ expressed in ps/nm-dB and equal to $-D_{DCF}/\alpha_{DCF}$ (giving a positive value since $D_{DCF}$ is itself negative), an average effective area $A_{eff}$ expressed in $\mu m^2$, and an average second order refractive index coefficient as a function of intensity $n_2$ expressed in $10^{-20} m^2/W$. As already explained above, firstly, the average coefficient of attenuation in the case of a single compensation optical fiber is lumped with the corresponding coefficient of attenuation of the single compensation optical fiber and in the case of a set of compensation optical fibers in series, the average coefficient of attenuation is equal to the sum of the corresponding attenuation coefficients of the various compensation optical fibers weighted by their respective contributions to the total series length of the compensation optical fibers plus the ratio of the connection loss divided by said total length, and secondly each of the other average parameters in the case of a single compensation optical fiber is lumped with the corresponding parameter of the single compensation optical fiber and each of the other average parameters in the case of a set of compensation optical fibers in series is equal to the arithmetic mean of the corresponding parameters of the compensation optical fibers when weighted by the respective lengths of the compensation optical fibers.

The module has insertion losses IL, where $$IL = \frac{D_{DCM}}{D_{DCF}} \cdot \alpha_{DCF} + \Gamma_{in} + \Gamma_{out}$$

where $D_{DCM}=-1360$ ps/nm for compensating a standard single-mode line optical fiber or $D_{DCM}=-680$ ps/nm for compensating one example of a non-zero dispersion shifted single-mode line optical fiber. A standard segment of single-mode line optical fiber is approximately 80 kilometers (km) long, which gives an approximate cumulative chromatic dispersion of $-1360$ ps/nm for a standard single-mode line optical fiber or approximately $-680$ ps/nm for such an example of a non-zero dispersion shifted single-mode line optical fiber. Even for other examples of non-zero dispersion shifted single-mode line optical fiber having a cumulative dispersion slightly different from $-680$ ps/nm, evaluating the quality criterion with $D_{DCM}=-680$ ps/nm remains entirely valid. Moreover, to evaluate the quality of a module, the insertion losses are not the real insertion losses of the module, which could be relatively low if the module compensates only a portion of the cumulative dispersion, but rather the insertion losses that the module would have if it fully compensated the cumulative dispersion with a length of compensation optical fiber slightly longer than the length required to compensate only part of the cumulative dispersion. Moreover, in the formulae for the quality criterion, the quality-to-price ratio criterion, and the non-linearity criterion, the cumulative dispersion is chosen to be $-1360$ ps/nm or $-680$ ps/nm depending on the type of single-mode line optical fiber to be compensated, but the module can also be used to compensate other values of cumulative dispersion or even to compensate only a portion of the cumulative dispersion. The insertion losses decrease as the figure of merit increases. The insertion losses remain constant for a constant figure of merit.

To be able to compensate to within approximately ±20% the chromatic dispersion to dispersion slope ratio of a standard single-mode line optical fiber, the compensation optical fiber or the set of compensation optical fibers in series has an average chromatic dispersion to dispersion slope ratio in the range 240 nm to 400 nm. To be able to compensate to within approximately ±10% the chromatic dispersion to dispersion slope ratio of a standard single-mode line optical fiber, the compensation optical fiber or the set of compensation optical fibers in series preferably has an average chromatic dispersion to dispersion slope ratio in the range 270 nm to 370 nm.

To be able to compensate the chromatic dispersion to dispersion slope ratio of most non-zero dispersion shifted single-mode line optical fibers, the compensation optical fiber or the set of compensation optical fibers in series preferably has an average chromatic dispersion to dispersion slope ratio less than 200 nm.

The module has a non-linearity criterion (NLC) representing non-linear effects, i.e. the effects of non-linear phase, in the particular-case of constant losses between the two amplifiers of the two-stage amplifier system,
where $$NLC = \frac{100 \cdot n_2 \cdot \left(1 - 10^{\frac{D_{DCM}}{10 \cdot FOM_{DCF}}}\right)}{A_{eff} \cdot \alpha_{DCF} \cdot 10^{\frac{\Gamma_{in}}{10}}}.$$

However, although less relevant in other amplification system structures, such as a single-stage amplifier system comprising only one amplifier and no attenuator, the non-linearity criterion would then continue to be of benefit anyway. This non-linearity criterion leads to a seeming paradox, namely that increasing the attenuation of an optical fiber at constant figure of merit reduces the non-linearity criterion and increases the performance of the module. The non-linearity criterion can even be reduced by reducing the figure of merit, provided that the attenuation is increased sufficiently without excessively degrading the effective area and the coefficient $n_2$.

The module has a quality criterion CQ defined as follows: CQ=IL+10logNLC. The two contributions, namely the insertion losses and the non-linearity criterion, are reduced to the same units and expressed in dB. The quality criterion CQ is representative of the overall quality of a compensation module.

The module has a quality-to-price ratio criterion CQ2 that is defined as follows: CQ2=CQ+Blog($FOM_{DCF}$), where B=18 for compensating a standard single-mode line optical fiber or B=23 for compensation of a non-zero dispersion shifted single-mode line optical fiber. The figure of merit of a compensation optical fiber is representative of the difficulty of producing the compensation optical fiber and consequently the cost of the associated compensation module, and high figures of merit are even more difficult to obtain when seeking to achieve chromatic dispersion to dispersion slope ratios close to those of non-zero dispersion shifted single-mode line optical fibers than when seeking to achieve chromatic dispersion to dispersion slope ratios close to the highest ratios that can be achieved for standard single-mode line optical fibers. This explains the difference in the value of the coefficient B, which is increased in the range 18 to 23 to take account of this greater difficulty in production. The portion Blog($FOM_{DCF}$) is also expressed in dB.

Especially when integrating the compensation module into the middle of a two-stage amplifier system, the quality criterion indicates that it is beneficial to degrade the insertion losses slightly if the losses due to the non-linear effects represented by the non-linearity criterion are improved proportionately more. For example, it is beneficial to increase the insertion losses by 1 dB if this decreases the contribution of the non-linearity criterion to the quality criterion by 2 dB. Since the insertion losses between the two amplifiers of the two-stage amplification system are fixed, any reduction of the insertion losses below the fixed threshold has no benefit except for the resulting reduction in non-linear effects, which can be obtained more easily by greatly reducing the quality criterion in conjunction with a small increase in the insertion losses. Below the fixed threshold, additional reduction of the insertion losses will not achieve any improvement in terms of the overall optical loss budget, because it will be canceled out by a corresponding increase in the attenuation of the attenuator; the only advantage associated with this reduction of the insertion losses is achieved in terms of ability to accommodate non-linear effects, which improved ability can be obtained more easily and more effectively by trading a slight increase in the insertion losses against a correspondingly greater reduction of the non-linearity criterion. The largest contribution to the quality criterion is that of the non-linearity criterion; consequently, it is beneficial to rebalance the respective contributions of the insertion losses and the non-linearity criterion with the aid of a loss distribution criterion CRP, which is defined as follows:

$$CRP = 1 - \frac{2IL}{CQ},$$

which is equivalent to $$CRP = \frac{10 \log NLC - IL}{10 \log NLC + IL},$$

and this must be reduced.

With a chosen constant figure of merit for the compensation optical fiber, reducing the quality criterion amounts to reducing the non-linearity criterion, since the insertion losses are constant for a constant figure of merit of the compensation optical fiber when the only parameters that vary are the parameters of the compensation optical fiber. Reducing the non-linearity criterion at constant figure of merit amounts to increasing the product of multiplying the attenuation by the effective area and dividing by the coefficient $n_2$. Reducing $n_2$ and increasing the effective area seem only natural, whereas increasing the attenuation of the compensation optical fiber seems somewhat paradoxical. The invention reflects this in an increase in the module optimization criterion COM, which is expressed in $10^{10}$ dB²-W/s, is defined as follows:

$$COM = \frac{100 \cdot \alpha_{DCF} \cdot A_{\mathit{eff}}}{n_2 \cdot FOM_{DCF}},$$

and this is to be increased. Somewhat surprisingly, although in the prior art the aim has been to minimize the attenuation of the compensation optical fiber whatever the cost, this attenuation is located in the numerator of a fraction that is to be increased, and although in the prior art the aim has been to increase the figure of merit of the compensation optical fiber whatever the cost, this figure of merit is located in the denominator of a fraction that is to be increased. A relatively high module optimization criterion corresponds to a compensation optical fiber that is optimized for use in a compensation module.

Figure 1:
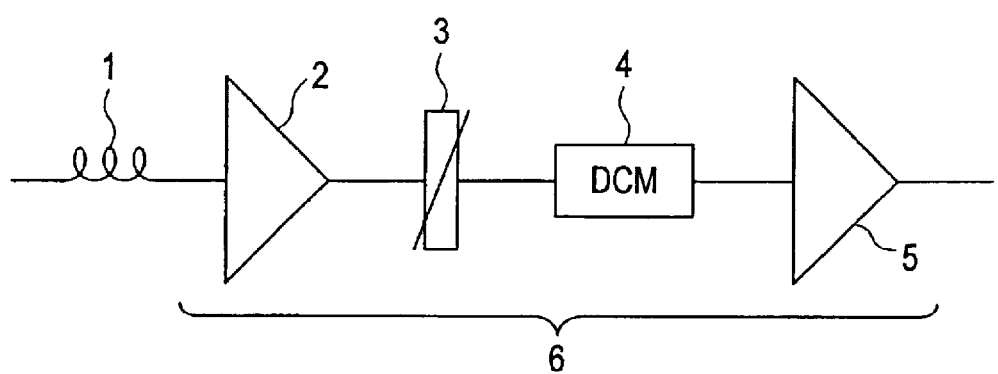
FIG. 1 is a diagram showing an example of a transmission line integrating a compensation module of the invention.

FIG. 1 is a diagram showing an example of a transmission line integrating a compensation module of the invention. The transmission line corresponds to a segment which, when periodically repeated and combined with send and receive devices, constitutes the communications system. The transmission line comprises in succession, in the propagation direction of the optical signal, a line optical fiber 1 and an amplification and compensation system 6. The amplification and compensation system 6 comprises in succession an upstream amplifier 2, an attenuator 3, a compensation module 4 of the invention, and a downstream amplifier 5. Downstream from the downstream amplifier 5 is is the line optical fiber 1 of the next segment. After propagating along the line optical fiber 1, the optical signal is amplified by the upstream amplifier 2, attenuated by the attenuator 3, has its chromatic dispersion compensated by the compensation module 4, and is amplified again by the downstream amplifier 5, before entering the next segment, i.e. the next transmission line.

Figure 2:
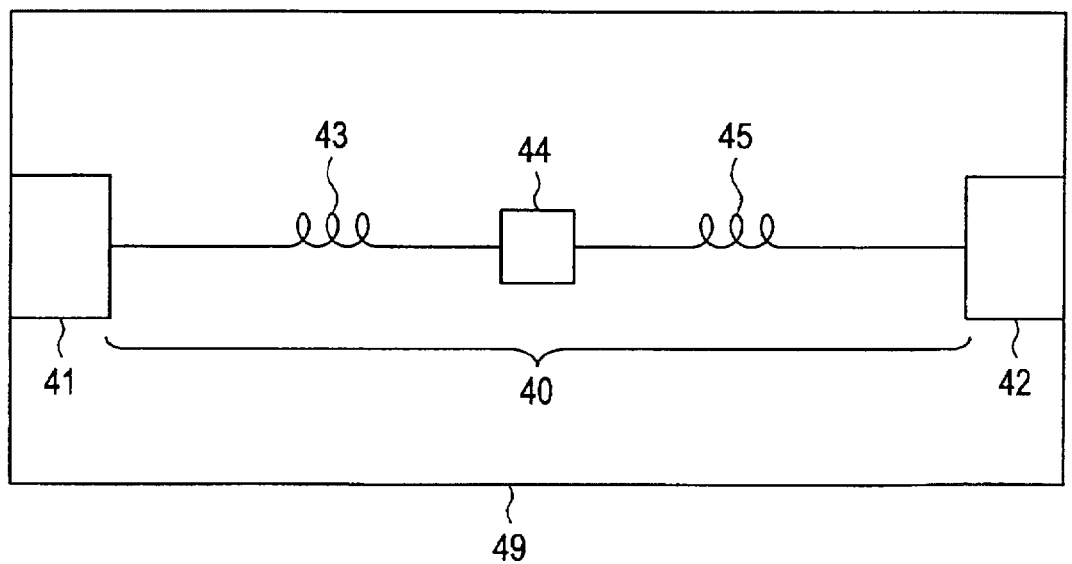
FIG. 2 is a diagram showing an example of a compensation module of the invention.

FIG. 2 is a diagram showing an example of a compensation module of the invention. The compensation module 4 comprises an enclosure 49 containing, in succession: an input terminal 41; a chromatic dispersion compensation optical line 40; and an output terminal 42. The compensation optical line 40 can comprise one or more optical fibers in series interconnected by connectors. In FIG. 2, for example, the compensation optical line 40 comprises two compensation optical fibers 43 and 45 connected together by a connector 44. On the upstream side, at the output of the attenuator 3, the optical signal enters via the input terminal 41, propagates in the compensation optical fiber 43, passes through the connector 44, propagates in the compensation optical fiber 45, and then exits via the downstream output terminal 42, i.e. at the input of the downstream amplifier 5.

FIG. 3 is a table comparing the relative performance of prior art compensation modules and examples of compensation modules in accordance with the invention in the case of compensating a standard single-mode line optical fiber. The first column gives the numbers of the compensation module examples. The prior art compensation module examples are numbered A1, A2, B1, B2, C1, C2. The examples of compensation modules in accordance with the invention are numbered N1, N2, N3, N4. The next column gives the negative of the cumulative chromatic dispersion of the line optical fiber, which is the negative of the chromatic dispersion that it would be necessary to compensate in order to compensate fully 80 km of the line optical fiber. This parameter is denoted $D_{DCM}$ and is expressed in ps/nm. The next column gives the chromatic dispersion of the compensation optical fiber, denoted $D_{DCF}$ and expressed in ps/nm-km. The next column gives the dispersion slope of the compensation optical fiber, which is denoted $S_{DCF}$ and is expressed in ps/nm²-km. The next column gives the average chromatic dispersion to dispersion slope ratio of the compensation optical fiber, which is denoted $D_{DCF}/S_{DCF}$ and is expressed in nm. The next column gives the coefficient of attenuation of the compensation optical fiber, which is denoted $\alpha_{DCF}$ and is expressed in dB/km. The next column gives the figure of merit of the compensation optical fiber, which is denoted $FOM_{DCF}$ and is expressed in ps/nm-dB. The next column gives the input loss of the input terminal of the compensation module, which is substantially equal to the output loss of the output terminal of the compensation module, is denoted Γ and is expressed in dB. The next column gives the insertion losses of the compensation module, which are denoted IL and are expressed in dB. The next column gives the effective area of the compensation fiber, which is denoted $A_{\mathit{eff}}$ and is expressed in $\mu m^2$. The next column gives the average second order coefficient of the refractive index of the compensation optical fiber as a function of the intensity of the light signal that propagates in the fiber, which is denoted $n_2$ and is expressed in $10^{-20}$ m²/W. The next column gives the non-linearity criterion of the compensation module, which is denoted NLC and is expressed in 10–6 km/W-dB. The next column gives the quality criterion of the compensation module, which is denoted CQ and is expressed in dB. The next column gives the quality-to-price ratio criterion of the compensation module, which is denoted CQ2 and is expressed in dB. The next column gives the module optimization criterion of the compensation optical fiber, which is denoted COM and is expressed in $10^{-10}$ dB²-W/s. The next column gives the loss distribution criterion of the compensation module, which is denoted CRP and is expressed in %.

Compensation modules of the invention have a quality-to-price ratio criterion which is much lower and therefore significantly better than that of prior art modules: there is more than half a decibel difference between the worst compensation module obtained by means of the method of the invention and the best prior art compensation module. An improvement of half a decibel is already considerable.

The invention preferably relates to compensation modules having a very good quality criterion; to this end, the compensation optical fiber or the set of compensation optical fibers in series has, for a given average figure of merit, an average attenuation that is sufficiently high for the quality criterion to be less than 18.5 dB.

The invention preferably relates to compensation modules having an excellent quality criterion; to this end, the compensation optical fiber or the set of compensation optical fibers in series has, for a given average figure of merit, an average attenuation that is sufficiently high for the quality criterion to be less than 17.5 dB.

The invention preferably relates to compensation modules having a very good quality-to-price ratio criterion; to this end, the compensation optical fiber or the set of compensation optical fibers in series has, for a given average figure of merit, an average attenuation that is sufficiently high for the quality criterion to be less than 60.8 dB.

The invention preferably relates to compensation modules having an excellent quality-to-price ratio criterion; to this end, the compensation optical fiber or the set of compensation optical fibers in series has, for a given average figure of merit, an average attenuation that is sufficiently high for the quality criterion to be less than 60.3 dB.

Still with the aim of improving the quality criterion or the quality-to-price ratio criterion, the compensation module preferably complies with a number of preferred thresholds described below.

The compensation optical fiber or the set of compensation optical fibers in series preferably has a module optimization criterion that is greater than 2. The module optimization criterion is advantageously greater than 2.5.

The compensation optical fiber or the set of compensation optical fibers in series preferably has an average figure of merit in the range 200 ps/nm-dB to 250 ps/nm-dB.

The compensation optical fiber or the set of compensation optical fibers in series preferably has an average attenuation greater than 0.9 dB/km. The compensation optical fiber or the set of compensation optical fibers in series advantageously has an average attenuation greater than 1.1 dB/km.

The compensation module preferably has a loss distribution criterion that is less than 30%. The loss distribution criterion is advantageously less than 23%.

FIG. 4 is a table comparing the relative performance of prior art compensation modules and examples of compensation modules in accordance with the invention in the case of compensating a non-zero dispersion shifted single-mode line optical fiber. The first column gives the numbers of the compensation module examples. The prior art compensation module examples are numbered B1, B2, B3, B4, C1, C2, C3, C4, C5, C6, C7. The examples of compensation modules in accordance with the invention are numbered N1, N2, N3, N4, N5. This numbering of the modules is not related in any way to the numbering of the modules used in FIG. 3: the same numbers in FIGS. 3 and 4 correspond to modules that are totally unrelated. The next column gives the negative of the cumulative chromatic dispersion of the line optical fiber, which is the negative of the chromatic dispersion that it would be necessary to compensate in order to fully compensate 80 km of the line optical fiber. This parameter is denoted $D_{DCM}$ and is expressed in ps/nm. The cumulative chromatic dispersion of a non-zero dispersion shifted single-mode line optical fiber is lower than the cumulative chromatic dispersion of a standard single-mode line fiber because its chromatic dispersion is lower. The next column gives the chromatic dispersion of the compensation optical fiber, which is denoted $D_{DCF}$ and expressed in ps/nm-km. The next column gives the dispersion slope of the compensation optical fiber, which is denoted $S_{DCF}$ and is expressed in ps/nm²-km. The next column gives the average chromatic dispersion to dispersion slope ratio of the compensation optical fiber, which is denoted $D_{DCF}/S_{DCF}$ and is expressed in nm. The next column gives the coefficient of attenuation of the compensation optical fiber, which is denoted $\alpha_{DCF}$ and is expressed in dB/km. The next column gives the figure of merit of the compensation optical fiber, which is denoted $FOM_{DCF}$ and is expressed in ps/nm-dB. The next column gives the input loss at the input terminal of the compensation module, which is substantially equal to the output loss at the output terminal of the compensation module, is denoted $\Gamma$ and is expressed in dB. The next column gives the insertion losses of the compensation module, which are denoted IL and are expressed in dB. The next column gives the effective area of the compensation fiber, which is denoted $A_{eff}$ and is expressed in $\mu m^2$. The next column gives the average second order coefficient of the refractive index of the compensation optical fiber as a function of the intensity of the light signal that propagates in the fiber, which is denoted $n_2$ and is expressed in $10^{-20}$ m²/W. The next column gives the non-linearity criterion of the compensation module, which is denoted NLC and is expressed in $10^{-6}$ km/W-dB. The next column gives the quality criterion of the compensation module, which is denoted CQ and is expressed in dB. The next column gives the quality-to-price ratio criterion of the compensation module, which is denoted CQ2 and is expressed in dB. The next column gives the module optimization criterion of the compensation optical fiber, which is denoted COM and is expressed in $10^{-10}$ dB²-W/s. The next column gives the loss distribution criterion of the compensation module, which is denoted CRP and is expressed in %.

The compensation modules of the invention have a quality-to-price ratio criterion which is much lower and therefore much better than that of the prior art modules: there is more than one decibel difference between the worst compensation module obtained by the method of the invention and the best prior art compensation module. A gain of one decibel is already considerable.

The invention preferably relates to compensation modules having a very good quality criterion; to this end, the compensation optical fiber or the set of compensation optical fibers in series has, for a given average figure of merit, an average attenuation that is sufficiently high for the quality criterion to be less than 15 dB.

The invention preferably relates to compensation modules having an excellent quality criterion; to this end, the compensation optical fiber or the set of compensation optical fibers in series has, for a given average figure of merit, an average attenuation that is sufficiently high for the quality criterion to be less than 13 dB.

The invention preferably relates to compensation modules having a very good quality-to-price ratio criterion; to this end, the compensation optical fiber or the set of compensation optical fibers in series has, for is a given average figure of merit, an average attenuation that is sufficiently high for the quality-to-price ratio criterion to be less than 66.1 dB.

The invention preferably relates to compensation modules having an excellent quality-to-price ratio criterion; to this end, the compensation optical fiber or the set of compensation optical fibers in series has, for a given average figure of merit, an average attenuation that is sufficiently high for the quality-to-price ratio criterion to be less than 65.6 dB.

Still with the aim of improving the quality criterion or the quality-to-price ratio criterion, the compensation module preferably complies with a number of preferred thresholds described below.

The compensation optical fiber or the set of compensation optical fibers in series preferably has a module optimization criterion that is greater than 3. The module optimization criterion is advantageously greater than 4.

The compensation optical fiber or the set of compensation optical fibers in series preferably has an average figure of merit in the range 170 ps/nm-dB to 220 ps/nm-dB.

The compensation optical fiber or the set of compensation optical fibers in series preferably has an average attenuation greater than 1.1 dB/km. The compensation optical fiber or the set of compensation optical fibers in series advantageously has an average attenuation greater than 1.3 dB/km.

The compensation optical module preferably has a loss distribution criterion less than 35%. The loss distribution criterion is advantageously less than 28%.

Figure 5:
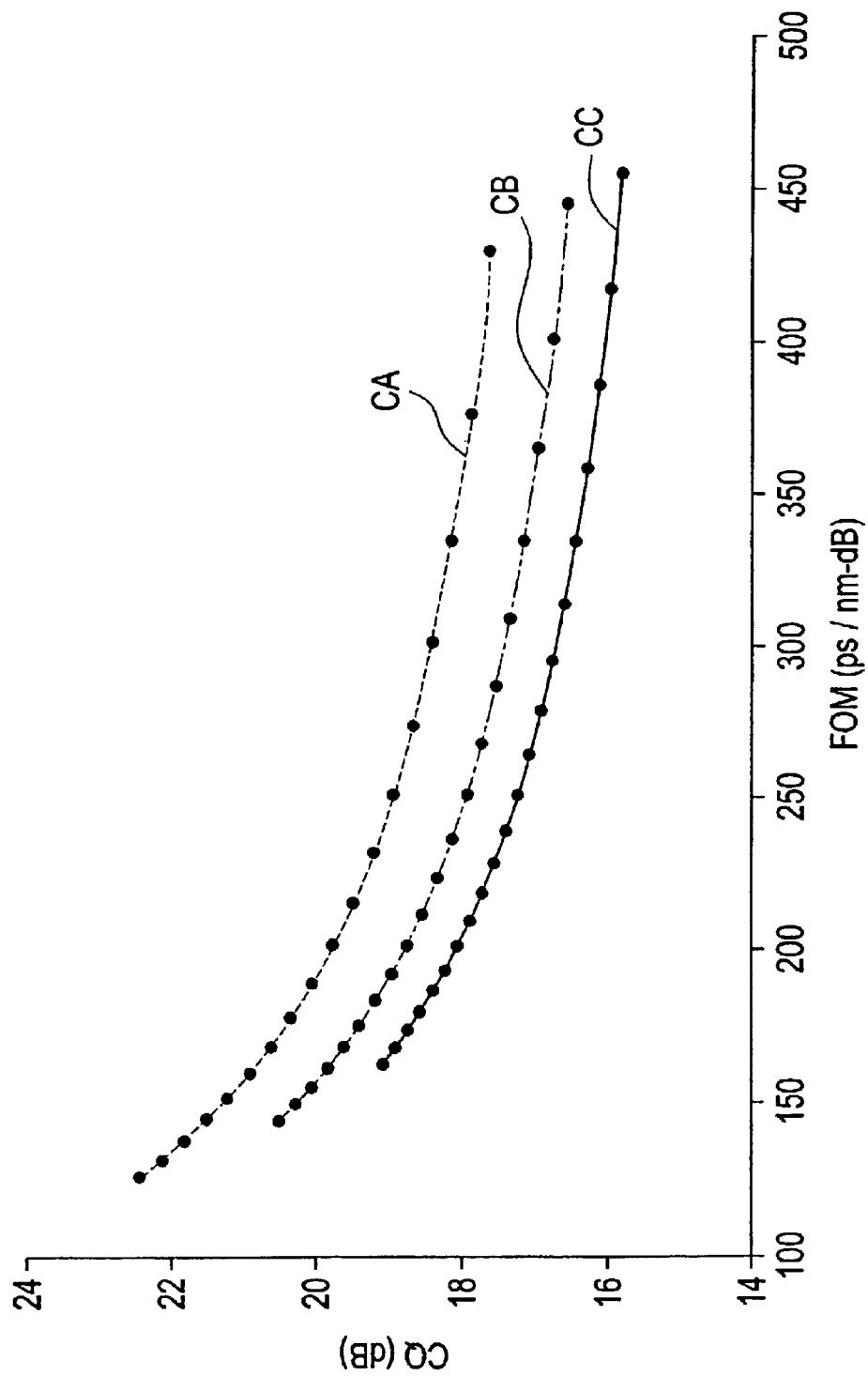
FIG. 5 is a diagram showing a family of curves plotting the variation in the quality criterion as a function of the figure of merit for the compensation optical fiber at a chosen constant chromatic dispersion for the compensation optical fiber in the case of compensating a standard single-mode line optical fiber.

FIG. 5 is a diagram showing a family of curves plotting the variation in the quality criterion as a function of the figure of merit of the compensation optical fiber at a chosen constant chromatic dispersion for the compensation optical fiber and in the case of compensating a standard single-mode line optical fiber. The quality criterion CQ expressed in dB is plotted up the ordinate axis. The figure of merit $FOM_{DCF}$ expressed in ps/nm-dB is plotted along the abscissa axis. Curve CA corresponds to a chromatic dispersion of −150 ps/nm-km. Curve CB corresponds to a chromatic dispersion of −200 ps/nm-km. Curve CC corresponds to a chromatic dispersion of −250 ps/nm-km. By their relatively shallow slope and their relatively large spacing, the curves CA, CB, CC show that to in order to reduce the quality criterion, and thus to improve it, it is more effective to reduce the chromatic dispersion of the compensation optical fiber at constant figure of merit than it is to increase the figure of merit of the compensation optical fiber at constant chromatic dispersion. This is particularly true if the figure of merit is high and in particular greater than a value of approximately 200 ps/nm-dB. When compensating a non-zero dispersion shifted line optical fiber, the value of that preferred threshold is around 150 ps/nm-dB.

Figure 6:
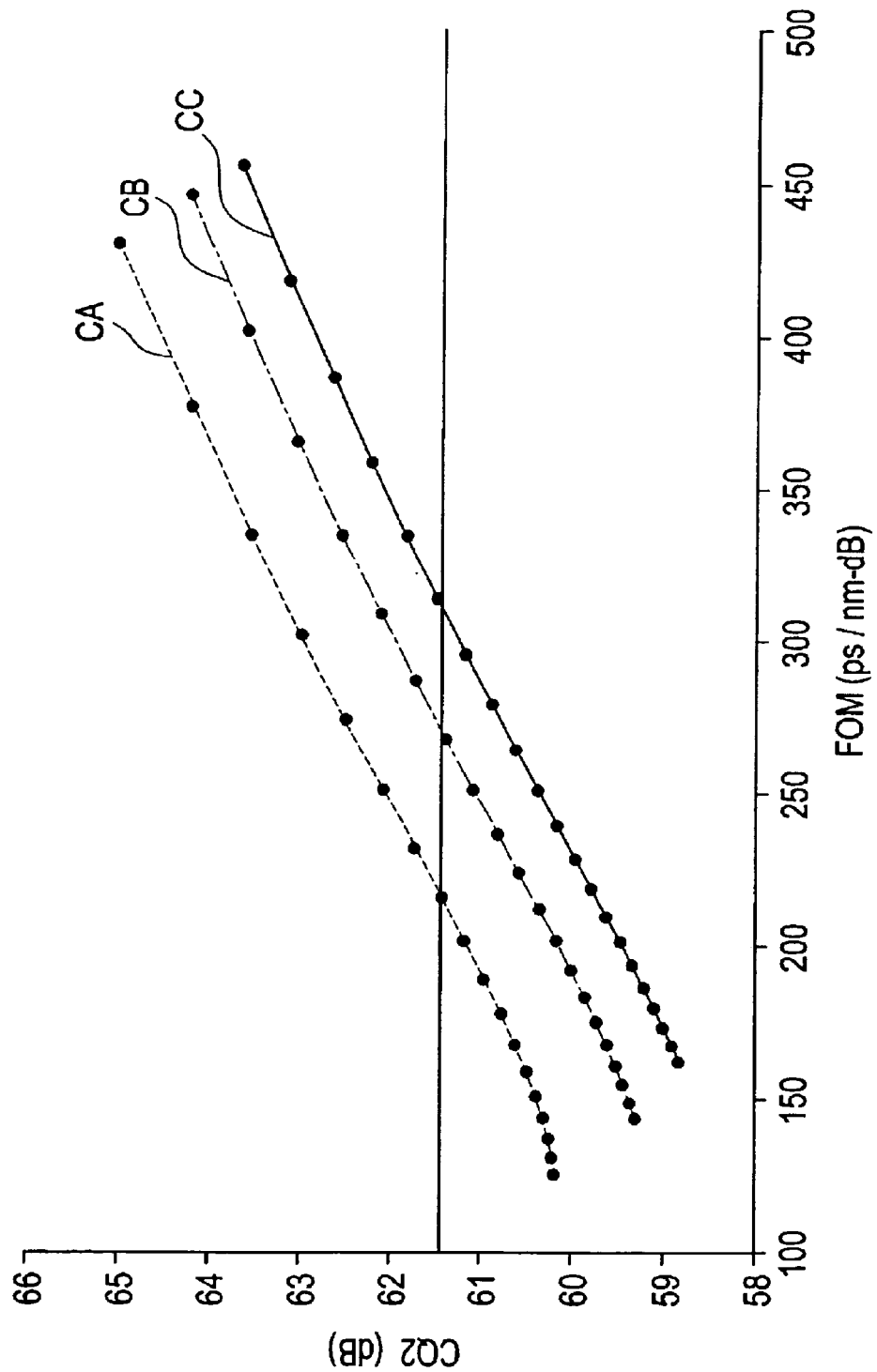
FIG. 6 is a diagram showing a family of curves plotting the variation in the quality-to-price ratio criterion as a function of the figure of merit of the compensation optical fiber at a chosen constant chromatic dispersion for the compensation optical fiber in the case of compensating a standard single-mode line optical fiber.

FIG. 6 is a diagram showing a family of curves plotting the variation in the quality-to-price ratio criterion as a function of the figure of merit of the compensation optical fiber at a chosen constant chromatic dispersion for the compensation optical fiber and in the case of compensating a standard single-mode line optical fiber. The quality-to-price ratio criterion CQ2 expressed in dB is plotted up the ordinate axis. The figure of merit $FOM_{DCF}$ expressed in ps/nm-dB is plotted along the abscissa axis. Curve CA corresponds to a chromatic dispersion of −150 ps/nm-km. Curve CB corresponds to a chromatic dispersion of −200 ps/nm-km. Curve CC corresponds to a chromatic dispersion of −250 ps/nm-km. By their relatively shallow slope and their relatively large spacing, the curves CA, CB, CC show that in order to reduce the quality-to-price ratio criterion, and thus in order to improve it, it is more effective to reduce the chromatic dispersion of the compensation optical fiber at constant figure of merit and it is counterproductive to increase the figure of merit of the compensation optical fiber at constant chromatic dispersion. However, to obtain a minimum quality criterion, it is nevertheless necessary to increase the figure of merit beyond a certain threshold.

Figure 7:
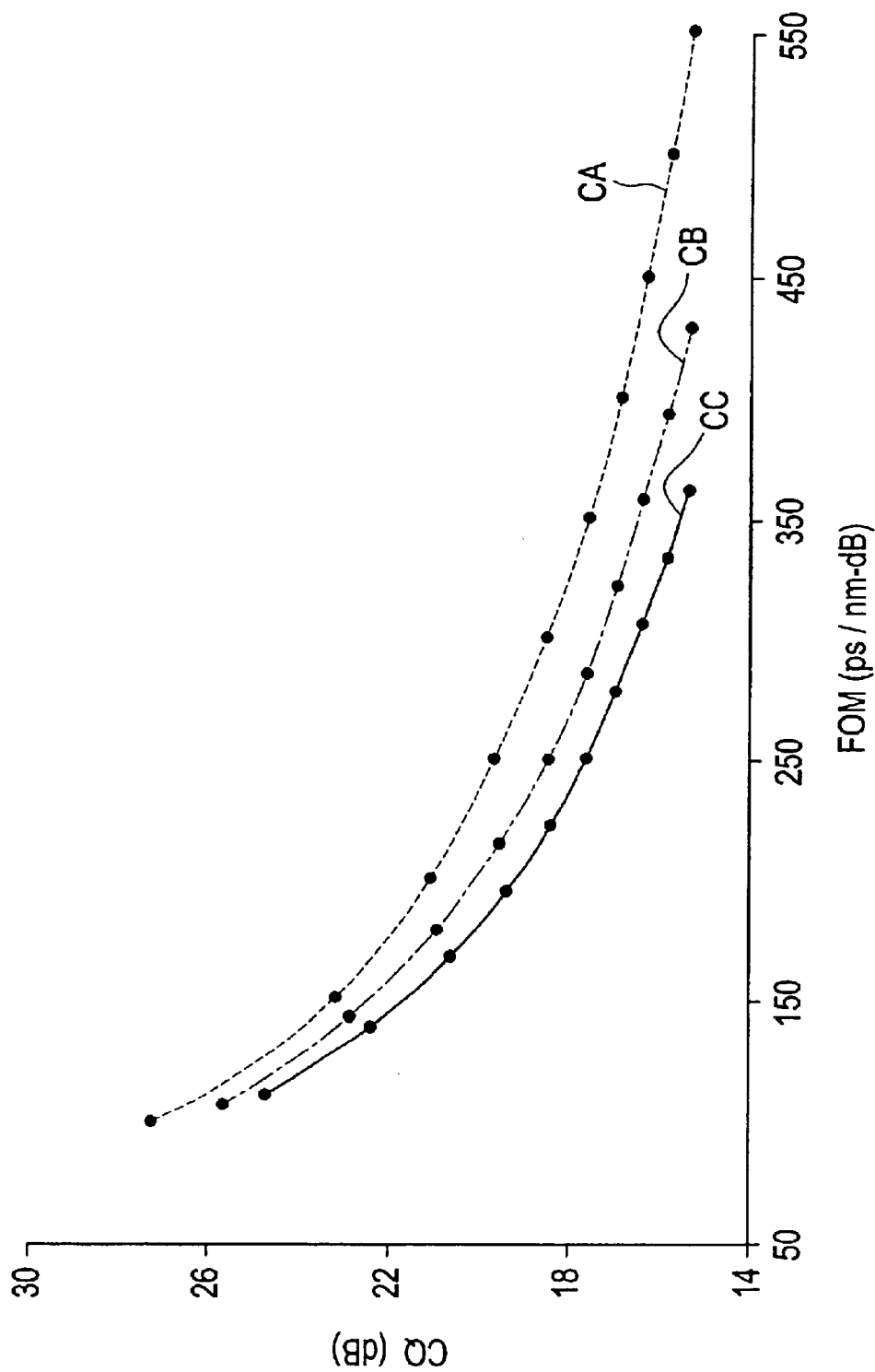
FIG. 7 is a diagram showing a family of curves plotting the variation in the quality criterion as a function of the figure of merit of the compensation optical fiber at a chosen constant attenuation for the compensation optical fiber in the case of compensating a standard single-mode line optical fiber.

FIG. 7 is a diagram showing a family of curves plotting the variation in the quality criterion as a function of the figure of merit of the compensation optical fiber at a chosen constant attenuation for the compensation optical fiber and in the case of compensating a standard single-mode line optical fiber. The quality criterion CQ expressed in dB is plotted up the ordinate axis. The figure of merit $FOM_{DCF}$ expressed in ps/nm-dB is plotted along the abscissa axis. Curve CA corresponds to a chromatic dispersion of 0.5 dB/km. Curve CB corresponds to a chromatic dispersion of 0.7 dB/km. Curve CC corresponds to a chromatic dispersion of 0.9 dB/km. By their relatively shallow slope and their relatively large spacing, the curves CA, CB, CC show that in order to reduce the quality criterion, and thus to improve it, it is more effective to increase the attenuation of the compensation optical fiber at constant figure of merit than it is to increase the figure of merit of the compensation optical fiber at constant attenuation. This is particularly true if the figure of merit is high and in particular greater than a value of approximately 200 ps/nm-dB. When compensating a non-zero dispersion shifted line optical fiber, the value of that preferred threshold is around 150 ps/nm-dB.

Figure 8:
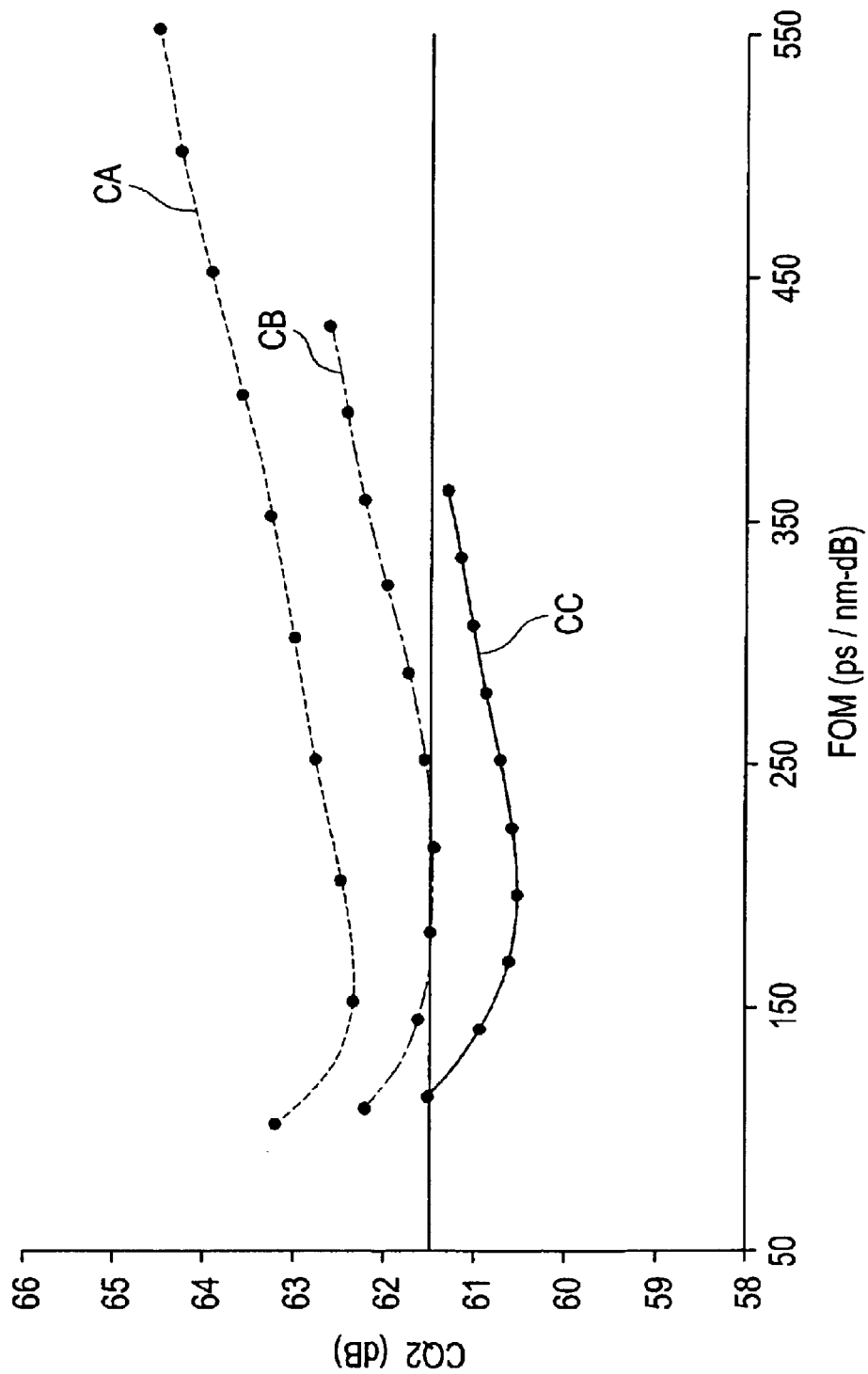
FIG. 8 is a diagram showing a family of curves plotting the variation in the quality-to-price ratio criterion as a function of the figure of merit of the compensation optical fiber at a chosen constant attenuation for the compensation optical fiber in the case of compensating a standard single-mode line optical fiber.

FIG. 8 is a diagram showing a family of curves plotting the variation in the quality-to-price ratio criterion as a function of the figure of merit of the compensation optical fiber at a chosen constant attenuation for the compensation optical fiber and in the case of compensating a standard single-mode line optical fiber. The quality-to-price ratio criterion CQ2 expressed in dB is plotted up the ordinate axis. The figure of merit $FOM_{DCF}$ expressed in ps/nm-dB is plotted along the abscissa axis. Curve CA corresponds to a chromatic dispersion of 0.5 dB/km. Curve CB corresponds to a chromatic dispersion of 0.7 dB/km. Curve CC corresponds to a chromatic dispersion of 0.9 dB/km. By the presence of a relatively flat minimum and their relatively large spacing, the curves CA, CB, CC show that in order to reduce the quality-to-price ratio criterion, and thus in order to improve it, it is more effective to increase the attenuation of the compensation optical fiber at constant figure of merit, and further there is an optimal range for the figure of merit of the compensation optical fiber, which must be neither too low nor too high. The optimum range is a function of attenuation but varies relatively little as a function of attenuation. A minimum figure of merit threshold must nevertheless be complied with in order to obtain a very good quality factor, but increasing the figure of merit as much as possible at any cost is not at all the method recommended by the invention.

FIG. 9 is a diagram showing a family of curves plotting the variation in the quality criterion as a function of the chromatic dispersion of the compensation optical fiber at a chosen constant figure of merit for the compensation optical fiber and in the case of compensating a standard single-mode line optical fiber. The quality criterion CQ expressed in dB is plotted up the ordinate axis. The chromatic dispersion expressed in ps/nm-dB is plotted along the abscissa axis. Curve CA corresponds to a figure of merit of 150 ps/nm-dB. Curve CA corresponds to a figure of merit of 200 ps/nm-dB. Curve CC corresponds to a chromatic dispersion of 250 ps/nm-dB. By their relatively steep slope and the relatively small spacing between them, the curves CA, CB, CC show that in order to reduce the quality criterion, and thus in order to improve it, it is more effective to reduce the chromatic dispersion of the compensation optical fiber at constant figure of merit than it is to increase the figure of merit of the compensation optical fiber at constant chromatic dispersion. This is particularly true if the figure of merit is high and in particular greater than a value of approximately 200 ps/nm-dB. When compensating a non-zero dispersion shifted line optical fiber the value of that preferred threshold is around 150 ps/nm-dB.

FIG. 10 is a diagram showing a family of curves plotting the variation in the quality criterion as a function of the attenuation of the compensation optical fiber at a chosen constant figure of merit for the compensation optical fiber and in the case of compensating a standard single-mode line optical fiber. The quality criterion CQ expressed in dB is plotted up the ordinate axis. The attenuation expressed in dB/km is plotted along the abscissa axis. Curve CA corresponds to a figure of merit of 150 ps/nm-dB. Curve CA corresponds to a figure of merit of 200 ps/nm-dB. Curve CC corresponds to a chromatic dispersion of 250 ps/nm-dB. By their relatively steep slope and their relatively small spacing, the curves CA, CB, CC show that in order to reduce the quality criterion, and thus in order to improve it, it is more effective to increase the attenuation of the compensation optical fiber at constant figure of merit than it is to increase the figure of merit of the compensation optical fiber at constant attenuation. This is particularly true if the figure of merit is high and in particular greater than a value of approximately 200 ps/nm-dB. When compensating a non-zero dispersion shifted line optical fiber the value of that preferred threshold is around 150 ps/nm-dB.

To obtain a simpler compensation module, the compensation optical line preferably consists of a single optical fiber connecting the input terminal to the output terminal. At the cost of some complexity, a plurality of compensation optical fibers in series provides better compensation of the dispersion slope of the line optical fiber.

The signal amplification and chromatic dispersion compensation system preferably comprises in succession a first signal amplifier, a signal attenuator, a chromatic dispersion compensation module of the invention, and a second signal amplifier.

The transmission line preferably comprises in succession a single-mode line optical fiber adapted to transmit information in a spectral domain of use and a signal amplification and chromatic dispersion compensation system of the invention.

What is claimed is:

1. A chromatic dispersion compensation module comprising,
    an enclosure (49) including an input terminal (41) and an output terminal (42),
    a chromatic dispersion compensation optical line (40) situated inside the enclosure and connecting the input terminal to the output terminal, the line comprising one or more chromatic dispersion compensation single-mode optical fibers (43, 45) in series and not comprising any HOM multimode optical fiber,
    the module being adapted to be inserted by means of the input and output terminals into a transmission line comprising a standard single-mode line optical fiber adapted to transmit information in a spectral domain of use,
    the input terminal introducing into the transmission line an input loss $\Gamma_{in}$ expressed in dB,
    the output terminal introducing into the transmission line an output loss $\Gamma_{out}$ expressed in dB,
    additional connections, if any, between compensation optical fibers together introducing into the transmission line a connection loss $\Gamma_{inter}$ expressed in dB,
    the compensation optical fiber or the set of compensation optical fibers in series having, at a wavelength of 1550 nm, a plurality of average parameters including an average coefficient of attenuation $\alpha_{DCF}$ expressed in dB/km, a negative average chromatic dispersion $D_{DCF}$ expressed in ps/nm-km, a negative average dispersion slope $S_{DCF}$ expressed in ps/nm$^2$-km, an average chromatic dispersion to dispersion slope ratio $D_{DCF}/S_{DCF}$ expressed in nm, an average figure of merit $FOM_{DCF}$ defined as $-D_{DCF}/\alpha_{DCF}$ expressed in ps/nm-dB, an average effective area $A_{eff}$ expressed in $\mu m^2$, and an average second order coefficient $n_2$ of the refractive index as a function of the intensity expressed in $10^{-20} m^2/W$,
    the average chromatic dispersion to dispersion slope ratio being the ratio between the average chromatic dispersion and the average dispersion slope,
    the average figure of merit being the negative of the ratio between the average chromatic dispersion and the average coefficient of attenuation,
    the average coefficient of attenuation in the case of a single compensation optical fiber being lumped with the corresponding coefficient of attenuation of said single compensation optical fiber and in the case of a set of compensation optical fibers in series, the average coefficient of attenuation is equal to the sum of the corresponding attenuation coefficients of the various compensation optical fibers weighted by their respective contributions to the total series length of the compensation optical fibers plus the ratio of the connection loss divided by said total length,
    each of said other average parameters in the case of a single compensation optical fiber being lumped with the corresponding parameter of said single compensation optical fiber and each of said other average parameters in the case of a set of compensation optical fibers in series being the arithmetic mean of the corresponding parameters of the various compensation optical fibers when weighted by the respective lengths of said various compensation optical fibers,
    the module having insertion losses IL expressed in dB, where $$IL = \frac{D_{DCM}}{D_{DCF}} \cdot \alpha_{DCF} + \Gamma_{in} + \Gamma_{out}$$

and where $D_{DCM} = -1360$ ps/nm,
    the module having a non-linearity criterion NLC representing the effects of the non-linear phase and expressed in $10^{-6}$ km/W-dB, where $$NLC = \frac{100 \cdot n_2 \cdot \left(1 - 10^{\frac{D_{DCM}}{10 \cdot FOM_{DCF}}}\right)}{A_{eff} \cdot \alpha_{DCF} \cdot 10^{\frac{\Gamma_{in}}{10}}},$$

the module having a quality criterion CQ expressed in dB, where CQ=IL+10log NLC,
    the module having a quality-to-price ratio criterion CQ2 expressed in dB,
    where CQ2=CQ+Blog($FOM_{DCF}$)
    and where B=18,
    and the compensation optical fiber or the set of compensation optical fibers in series having,
    firstly, average chromatic dispersion more negative than −130 ps/nm-km,
    secondly, average chromatic dispersion to dispersion slope ratio in the range 240 nm to 400 nm, and
    thirdly, for a given average figure of merit, average attenuation sufficiently high for the quality criterion to be less than 20.5 dB and the quality-to-price ratio criterion to be less than 61.3 dB.

2. A module according to claim 1, characterized in that the compensation optical fiber or the set of compensation optical fibers in series has, for a given average figure of merit, average attenuation that is sufficiently high for the quality criterion to be less than 18.5 dB.

3. A module according to claim 2, characterized in that the compensation optical fiber or the set of compensation optical fibers in series has, for a given average figure of merit, average attenuation that is sufficiently high for the quality criterion to be less than 17.5 dB.

4. A module according to either claim 1 or claim 2, characterized in that the compensation optical fiber or the set of compensation optical fibers in series has, for a given average figure of merit, average attenuation that is sufficiently high for the quality-to-price ratio criterion to be less than 60.8 dB.

5. A module according to claim 4, characterized in that the compensation optical fiber or the set of compensation optical fibers in series has, for a given average figure of merit, average attenuation that is sufficiently high for the quality-to-price ratio criterion to be less than 60.3 dB.

6. A module according to claim 1, characterized in that the compensation optical fiber or the set of compensation optical fibers in series has, for a given average figure of merit, average attenuation that is sufficiently high for the non-linearity criterion expressed in $10^{-6}$ km/W-dB to be less than 15.

7. A module according to claim 6, characterized in that the compensation optical fiber or the set of compensation optical fibers in series has, for a given average figure of merit, average attenuation that is sufficiently high for the non-linearity criterion expressed in $10^{-6}$ km/W-dB to be less than 13.

8. A module according to claim 1, characterized in that the compensation optical fiber or the set of compensation optical fibers in series has a module optimization criterion COM expressed in $10^{10}$ dB$^2$-W/s which is greater than 2, where $$COM = \frac{100 \cdot \alpha_{DCF} \cdot A_{eff}}{n_2 \cdot FOM_{DCF}}.$$

9. A module according to claim 8, characterized in that the module optimization criterion is greater than 2.5.

10. A module according to claim 1, characterized in that the compensation optical fiber or the set of compensation optical fibers in series has an average figure of merit in the range 200 ps/nm-dB to 250 ps/nm-dB.

11. A module according to claim 1, characterized in that the compensation optical fiber or the set of compensation optical fibers in series has an average attenuation greater than 0.9 dB/km.

12. A module according to claim 10, characterized in that the compensation optical fiber or the set of compensation optical fibers in series has an average attenuation greater than 1.1 dB/km.

13. A module according to claim 1, characterized in that it has a loss distribution criterion CRP less than 30%, where $$CRP = 1 - \frac{2IL}{CQ}.$$

14. A module according to claim 13, characterized in that the loss distribution criterion is less than 23%.

15. A module according to claim 1, characterized in that the compensation optical fiber or the set of compensation optical fibers in series has an average chromatic dispersion to dispersion slope ratio in the range 270 nm to 370 nm.

16. A chromatic dispersion compensation module comprising,
an enclosure (49) including an input terminal (41) and an output terminal (42),
a chromatic dispersion compensation optical line (40) situated inside the enclosure and connecting the input terminal to the output terminal, the line comprising one or more chromatic dispersion compensation single-mode optical fibers (43, 45) in series and not comprising any HOM multimode optical fiber,
the module being adapted to be inserted by means of the input and output terminals into a transmission line comprising a non-zero dispersion at 1550 nm single-mode dispersion shifted line optical fiber adapted to transmit information in a spectral domain of use,
the input terminal introducing into the transmission line an input loss $\Gamma_{in}$ expressed in dB,
the output terminal introducing into the transmission line an output loss $\Gamma_{out}$ expressed in dB,
additional connections, if any, between compensation optical fibers together introducing into the transmission line a connection loss $\Gamma_{inter}$ expressed in dB,
the compensation optical fiber or the set of compensation optical fibers in series having, at a wavelength of 1550 nm, a plurality of average parameters including an average coefficient of attenuation $\alpha_{DCF}$ expressed in dB/km, a negative average chromatic dispersion $D_{DCF}$ expressed in ps/nm-km, a negative average dispersion slope $S_{DCF}$ expressed in ps/nm$^2$-km, an average chromatic dispersion to dispersion slope ratio $D_{DCF}/S_{DCF}$ expressed in nm, an average figure of merit $FOM_{DCF}$ defined as $-D_{DCF}/\alpha_{DCF}$ expressed in ps/nm-dB, an average effective area $A_{eff}$ expressed in $\mu m^2$, and an average second order coefficient $n_2$ of the refractive index as a function of the intensity expressed in $10^{-20}$ m$^2$/W,
the average chromatic dispersion to dispersion slope ratio being the ratio between the average chromatic dispersion and the average dispersion slope,
the average figure of merit being the negative of the ratio between the average chromatic dispersion and the average coefficient of attenuation,
the average coefficient of attenuation in the case of a single compensation optical fiber being lumped with the corresponding coefficient of attenuation of said single compensation optical fiber and in the case of a set of compensation optical fibers in series, the average coefficient of attenuation is equal to the sum of the corresponding attenuation coefficients of the various compensation optical fibers weighted by their respective contributions to the total series length of the compensation optical fibers plus the ratio of the connection loss divided by said total length,
each of said other average parameters in the case of a single compensation optical fiber being lumped with the corresponding parameter of said single compensation optical fiber and each of said other average parameters in the case of a set of compensation optical fibers in series being the arithmetic mean of the corresponding parameters of the various compensation optical fibers when weighted by the respective lengths of said various compensation optical fibers,
the module having insertion losses IL expressed in dB, where $$IL = \frac{D_{DCM}}{D_{DCF}} \cdot \alpha_{DCF} + \Gamma_{in} + \Gamma_{out}$$

and where $D_{DCM} = -680$ ps/nm, the module having a non-linearity criterion NLC representing the effects of the non-linear phase and expressed in $10^{-6}$ km/W-dB, where $$NLC = \frac{100 \cdot n_2 \cdot \left(1 - 10^{\frac{D_{DCM}}{10 \cdot FOM_{DCF}}}\right)}{A_{eff} \cdot \alpha_{DCF} \cdot 10^{\frac{\Gamma_{in}}{10}}},$$

the module having a quality criterion CQ expressed in dB, where CQ=IL+10log NLC, the module having a quality-to-price ratio criterion CQ2 expressed in dB, where CQ2=CQ+Blog(FOM$_{DCF}$)

and where B=23, and the compensation optical fiber or the set of compensation optical fibers in series having, firstly, average chromatic dispersion more negative than −115 ps/nm-km, and secondly, for a given average figure of merit, average attenuation sufficiently high for the quality criterion to be less than 18 dB and the quality-to-price ratio criterion to be less than 66.6 dB.

17. A module according to claim 16, characterized in that the compensation optical fiber or the set of compensation optical fibers in series has, for a given average figure of merit, average attenuation that is sufficiently high for the quality criterion to be less than 15 dB.

18. A module according to claim 17, characterized in that the compensation optical fiber or the set of compensation optical fibers in series has, for a given average figure of merit, average attenuation that is sufficiently high for the quality criterion to be less than 13 dB.

19. A module according to either claim 16 or claim 17, characterized in that the compensation optical fiber or the set of compensation optical fibers in series has, for a given average figure of merit, average attenuation that is sufficiently high for the quality-to-price ratio criterion to be less than 66.1 dB.

20. A module according to claim 19, characterized in that the compensation optical fiber or the set of compensation optical fibers in series has, for a given average figure of merit, average attenuation that is sufficiently high for the quality-to-price ratio criterion to be less than 65.6 dB.

21. A module according to claim 16, characterized in that the compensation optical fiber or the set of compensation optical fibers in series has, for a given average figure of merit, average attenuation that is sufficiently high for the non-linearity criterion expressed in $10^{-6}$ km/W-dB to be less than 7.5.

22. A module according to claim 21, characterized in that the compensation optical fiber or the set of compensation optical fibers in series has, for a given average figure of merit, average attenuation that is sufficiently high for the non-linearity criterion expressed in $10^{-6}$ km/W-dB to be less than 6.5.

23. A module according to claim 16, characterized in that the compensation optical fiber or the set of compensation optical fibers in series has a module optimization criterion COM expressed in $10^{10}$ dB$^2$-W/s which is greater than 3, where $$COM = \frac{100 \cdot \alpha_{DCF} \cdot A_{eff}}{n_2 \cdot FOM_{DCF}}.$$

24. A module according to claim 23, characterized in that the module optimization criterion is greater than 4.

25. A module according to claim 16, characterized in that the compensation optical fiber or the set of compensation optical fibers in series has an average figure of merit in the range 170 ps/nm-dB to 220 ps/nm-dB.

26. A module according to claim 16, characterized in that the compensation optical fiber or the set of compensation optical fibers in series has an average attenuation greater than 1.1 dB/km.

27. A module according to claim 26, characterized in that the compensation optical fiber or the set of compensation optical fibers in series has an average attenuation greater than 1.3 dB/km.

28. A module according to claim 16, characterized in that it has a loss distribution criterion CRP less than 35%, where $$CRP = 1 - \frac{2IL}{CQ}.$$

29. A module according to claim 28, characterized in that the loss distribution criterion is less than 28%.

30. A module according to claim 16, characterized in that the compensation optical fiber or the set of compensation optical fibers in series has an average chromatic dispersion to dispersion slope less than 200 nm.

31. A module according to either claim 1 or claim 16, characterized in that the compensation optical line consists of a single optical fiber connecting the input terminal to the output terminal.

32. A module according to either claim 1 or claim 16, characterized in that the compensation optical line comprises a plurality of optical fibers of the same family, that is to say either a plurality of segments of the same optical fiber or a plurality of optical fibers that are similar within their fabrication tolerances.

33. A module according to either claim 1 or claim 16, characterized in that the compensation optical line comprises a plurality of separate optical fibers and in that the spectral domain of use comprises at least two of spectral bands S, C and L.

34. A signal amplification and chromatic dispersion compensation system comprising in succession a first signal amplifier (2), a signal attenuator (3), a chromatic dispersion compensation module (4) according to claim 1, and a second signal amplifier (5).

35. A transmission line comprising in succession a single-mode line optical fiber (1) adapted to transmit information in a spectral domain of use and a signal amplification and chromatic dispersion compensation system (6) according to claim 34.

36. A method of designing a chromatic dispersion compensation module, said module being adapted to comprise, an enclosure including an input terminal and an output terminal, a chromatic dispersion compensation optical line situated inside the enclosure and connecting the input terminal to the output terminal, the line comprising one or more chromatic dispersion compensation single-mode optical fibers in series and not comprising any HOM multimode optical fiber, said module being adapted to be inserted by means of the input and output terminals into a transmission line comprising a single-mode line optical fiber adapted to transmit information in a spectral domain of use, the input terminal introducing into the transmission line an input loss $\Gamma_{in}$ expressed in dB, the output terminal introducing into the transmission line an output loss $\Gamma_{out}$ expressed in dB, additional connections, if any, between compensation optical fibers together introducing into the transmission line a connection loss $\Gamma_{inter}$ expressed in dB, the compensation optical fiber or the set of compensation optical fibers in series having, at a wavelength of 1550 nm, a plurality of average parameters including an average coefficient of attenuation $\alpha_{DCF}$ expressed in dB/km, a negative average chromatic dispersion $D_{DCF}$ expressed in ps/nm-km, a negative average dispersion slope $S_{DCF}$ expressed in ps/nm²-km, an average chromatic dispersion to dispersion slope ratio $D_{DCF}/S_{DCF}$ expressed in nm, an average figure of merit $FOM_{DCF}$ defined as $-D_{DCF}/\alpha_{DCF}$ expressed in ps/nm-dB, an average effective area $A_{eff}$ expressed in $\mu m^2$, and an average second order coefficient $n_2$ of the refractive index as a function of the intensity expressed in $10^{-20}$ m²/W, the average chromatic dispersion to dispersion slope ratio being the ratio between the average chromatic dispersion and the average dispersion slope, the average figure of merit being the negative of the ratio between the average chromatic dispersion and the average coefficient of attenuation, the average coefficient of attenuation in the case of a single compensation optical fiber being lumped with the corresponding coefficient of attenuation of said single compensation optical fiber and in the case of a set of compensation optical fibers in series, the average coefficient of attenuation is equal to the sum of the corresponding attenuation coefficients of the various compensation optical fibers weighted by their respective contributions to the total series length of the compensation optical fibers plus the ratio of the connection loss divided by said total length, each of said other average parameters in the case of a single compensation optical fiber being lumped with the corresponding parameter of said single compensation optical fiber and each of said other average parameters in the case of a set of compensation optical fibers in series being the arithmetic mean of the corresponding parameters of the various compensation optical fibers when weighted by the respective lengths of said various compensation optical fibers, said module being adapted to have insertion losses IL expressed in dB, where $$IL = \frac{D_{DCM}}{D_{DCF}} \cdot \alpha_{DCF} + \Gamma_{in} + \Gamma_{out}$$

and where $D_{DCM}$ represents the negative of the cumulative dispersion of the line optical fiber, said module being adapted to have a non-linearity criterion NLC representing the effects of the non-linear phase and expressed in $10^{-6}$ km/W-dB, where $$NLC = \frac{100 \cdot n_2 \cdot \left(1 - 10^{\frac{D_{DCM}}{10 \cdot FOM_{DCF}}}\right)}{A_{eff} \cdot \alpha_{DCF} \cdot 10^{\frac{\Gamma_{in}}{10}}},$$

said module being adapted to have a quality criterion CQ expressed in dB, where CQ=IL+10log NLC, said design method including an optimization step for optimizing said module, said optimization step consisting in reducing the quality criterion at a chosen constant average figure of merit by increasing the average attenuation.

* * * * *